Patented May 19, 1931

1,805,555

UNITED STATES PATENT OFFICE

WALTER SCHOELLER, OF BERLIN-CHARLOTTENBURG, HANS JORDAN, OF BERLIN-STEGLITZ, AND REINHARD CLERC, OF BERLIN, GERMANY, ASSIGNORS TO SCHERING-KAHLBAUM A.-G., OF BERLIN, GERMANY

PRODUCTION OF ALKYLPHENOLS

No Drawing. Application filed June 22, 1928, Serial No. 287,636, and in Germany July 14, 1927.

Our invention refers to the production of alkylphenols which serve as starting materials for odorants, disinfectants and other pharmaceutical products.

In the copending application for patent of even date herewith and entitled: "Production of Isoalkylenphenols" Serial No. 287,638 we have described the thermic decomposition of dihydroxydiphenylmethane-derivatives into alkylenphenols and phenols.

The alkylenphenols thus obtained can be converted into alkylphenols by treating with hydrogen in the presence of a hydrogenation catalyst until two hydrogen atoms have entered into combination.

We have now found that if thermic decomposition is effected in a hydrogen atmosphere in the presence of a hydrogenation catalyst, alkylphenols and phenols are directly obtained according to the formula:

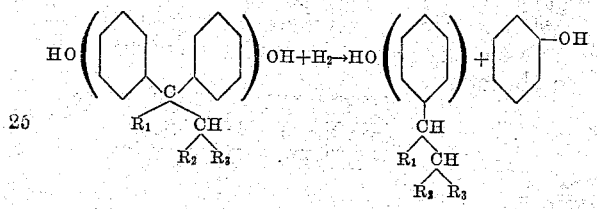

wherein $R_1$, $R_2$ and $R_3$ is a hydrogen atom or an univalent alkyl radical or $R_1$ and $R_2$ together a bivalent alkylene radical, forming with the two adjacent carbon atoms a cyclic system and wherein the two aryl nuclei also can have other substituents.

We have further found it preferable to add besides the hydrogenation-catalyst another catalyst capable of reducing the temperature at which thermic decomposition occurs. Such catalysts are porous bodies, known as surface-catalysts for instance "Frankonite," "Tonsil," which are magnesium aluminum silicates treated with acids and commonly used as adsorbents, fuller's earth, silica gel, active carbon and such like bodies. In carrying out the decomposition and hydrogenation it is sufficient to add besides the hydrogenation catalyst a quantity of surface catalyst from one half to one per cent of the weight of the dihydroxydiphenylmethane derivative. A surface catalyst upon which the hydrogenation catalyst is precipitated also can be used.

A dihydroxydiphenylmethane derivative, which undergoes very easily the joint decomposition and hydrogenation (spoken of) is the 2,2'-dihydroxy-4,4'-dimethyldiphenyldimethylmethane, which can be obtained according to the process described in our copending application of even date entitled "A new condensation product from meta-cresol and acetone," Serial No. 287,639.

Example 1

4,4' - dihydroxydiphenyldimethylmethane is treated in the presence of 3% of its weight of an ordinary hydrogenation-catalyst with hydrogen under pressure at 250–280° C. until 2 atoms of hydrogen are taken up. From the reaction product para-isopropylphenol and phenol can be separated by fractional distillation.

Example 2

4,4' - dimethyl -2,2'-dihydroxydiphenyldimethylmethane is treated with hydrogen as described in Example 1 at 215–220° C. After one-half an hour the reaction is completed. Thymol and meta-cresol are obtained.

Example 3

4,4'- dimethyl - 2,2'- dihydroxydiphenyldimethylmethane is treated with hydrogen as described in Example 1 at 140° C., after a few hours the reaction is completed. Thymol and meta-cresol are obtained, which can be separated by fractional distillation.

Example 4

4,4'-dihydroxydiphenyldimethylmethane is after the addition of 3% of an ordinary hydrogenation catalyst and 0.5% of Tonsil treated with hydrogen, if desired under pressure, at 140-150° C. until two atoms of hydrogen are taken up. From the reaction product para-isopropylphenol and phenol can be separated by fractional distillation.

*Example 5*

2,2'-dihydroxy-4,4'-dimethyldiphenyldimethylmethane is treated as described in Example 4 with hydrogen at 130-140° C. but in the presence of "Frankonite" upon which a catalyst comprising a mixture of nickel, cobalt and copper has been precipitated. Thymol and meta-cresol are obtained.

*Example 6*

4,4'-dihydroxydiphenylmethylmethane is after the addition of "Frankonite" upon which a nickel-cobalt-copper-catalyst has been precipitated, treated with hydrogen under pressure at 150° C., until 2 atoms of hydrogen are taken up. Ethylphenol and phenol are obtained, which can be separated by fractional distillation.

Various changes may be made in the details disclosed in the foregoing specification without departing from the invention or sacrificing the advantages thereof.

We claim:—

1. The process of producing alkylphenols comprising heating a dihydroxydiphenylmethane of the formula.

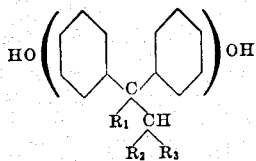

wherein $R_1$, $R_2$ and $R_3$ each is a hydrogen atom or an univalent alkyl radical, or $R_1$ and $R_2$ together a bivalent alkylene radical forming with the two adjacent carbon atoms a cyclic system and wherein the two aryl nuclei also can have other substituents, in a hydrogen atmosphere in the presence of a hydrogenation catalyst until two hydrogen atoms have entered into combination.

2. The process of producing alkylphenols comprising heating a dihydroxydiphenylmethane of the formula

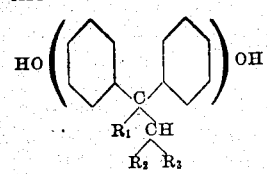

wherein $R_1$, $R_2$ and $R_3$ each is a hydrogen atom or an univalent alkyl radical, or $R_1$ and $R_2$ together a bivalent alkylene radical forming with the two adjacent carbon atoms a cyclic system and wherein the two aryl nuclei also can have other substituents, in a hydrogen atmosphere in the presence of a hydrogenation catalyst and of contact masses having high porosity, until two hydrogen atoms have entered into combination.

3. The process of producing alkylphenols comprising heating a dihydroxydiphenylmethane of the formula

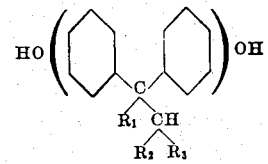

wherein $R_1$, $R_2$ and $R_3$ each is a hydrogen atom or an univalent alkyl radical, or $R_1$ and $R_2$ together a bivalent alkylene radical forming with the two adjacent carbon atoms a cyclic system and wherein the two aryl nuclei also can have other substituents, in a hydrogen atmosphere in the presence of contact masses having high porosity, upon which a hydrogenation catalyst has been precipitated until two hydrogen atoms have entered into combination.

4. The process of producing thymol comprising heating 4,4'-dimethyl-2,2'-dihydroxydiphenyldimethylmethane in a hydrogen atmosphere in the presence of a hyodrogenation catalyst until two hydrogen atoms have entered into combination.

5. The process of producing thymol comprising heating 4,4'-dimethyl-2,2'-dihydroxydiphenyldimethylmethane in a hydrogen atmosphere in the presence of a hydrogenation catalyst and of contact masses having a high porosity until two hydrogen atoms have entered into combination.

6. The process of producing thymol comprising heating 4,4'-dimethyl-2,2'-dihydroxydiphenyldimethylmethane in a hydrogen atmosphere, in the presence of contact masses having a high porosity upon which a hydrogenation catalyst has been precipitated until two hydrogen atoms have entered into combination.

WALTER SCHOELLER.
HANS JORDAN.
REINHARD CLERC.